W. C. BAKER.
POWER TRANSMITTING MECHANISM.
APPLICATION FILED OCT. 8, 1913.
1,110,101.
Patented Sept. 8, 1914.
2 SHEETS—SHEET 1.
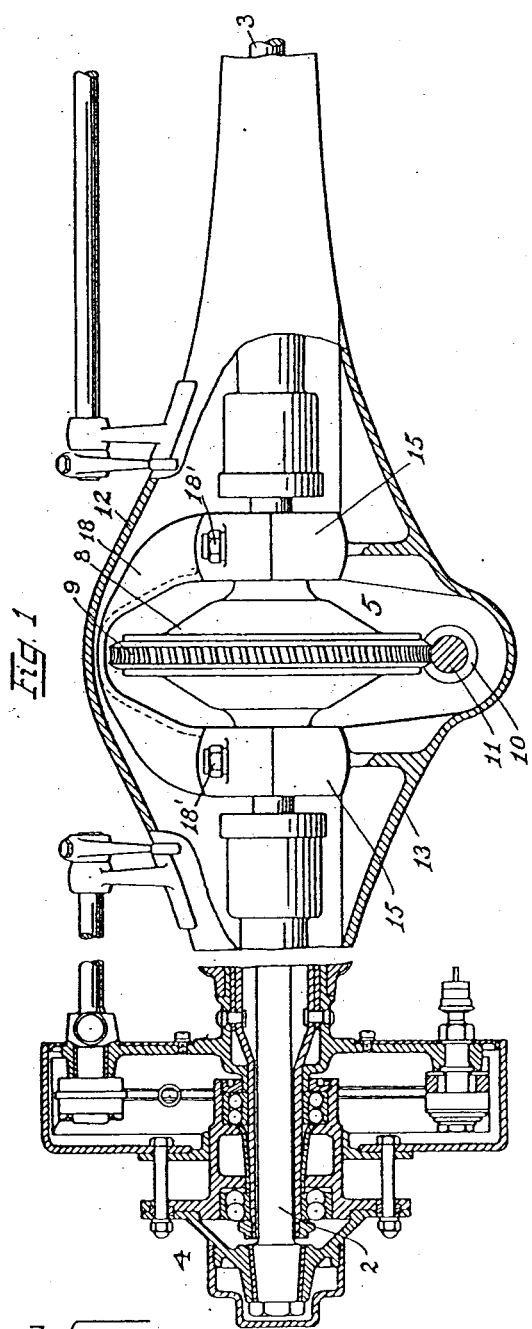
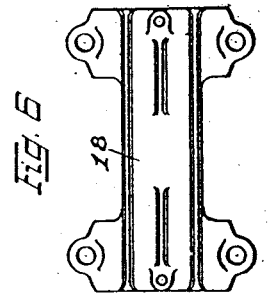
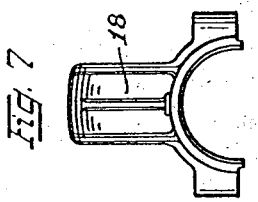
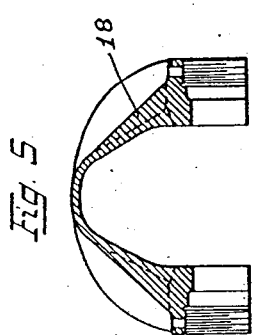
Witnesses:
Inventor:
Walter C. Baker
by
Attorney.

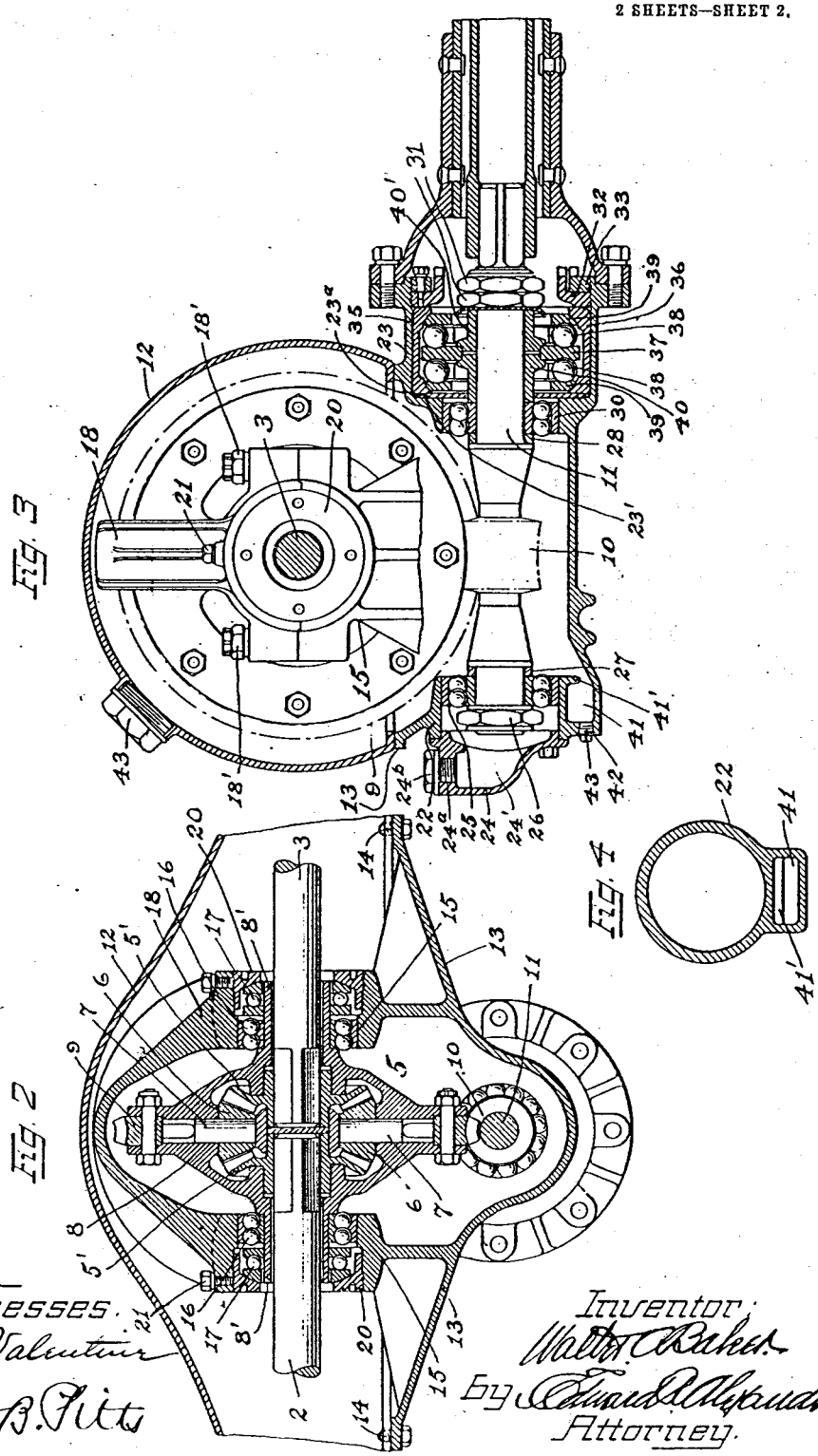

UNITED STATES PATENT OFFICE.

WALTER C. BAKER, OF CLEVELAND, OHIO.

POWER-TRANSMITTING MECHANISM.

1,110,101.  Specification of Letters Patent.  Patented Sept. 8, 1914.

Application filed October 8, 1913. Serial No. 794,003.

*To all whom it may concern:*

Be it known that I, WALTER C. BAKER, a citizen of the United States, residing at Cleveland, in the county of Cuyahoga and State of Ohio, have invented certain new and useful Improvements in and Relating to Power-Transmitting Mechanism, of which the following is a specification.

This invention relates to improvements in power transmitting mechanism. More particularly it has to do with the mounting of worm gear driving mechanism.

It has for its object to provide for the efficient, quiet running and durable mounting of a worm and worm gear, more particularly where the worm gear drives suitable differential mechanism for transmitting power to two alined shaft sections, such for example as the shaft sections used in driving axles for motor cars.

For the purpose of illustrating my invention, I have selected and hereinafter described one construction embodying it.

Figure 1 is a view, partly in elevation and partly in section, of mechanism embodying my invention. Fig. 2 is a vertical section through the axis of the driven shafts. Fig. 3 shows in section the housing in the vertical plane of the axis of the driving shaft, other parts being shown in elevation and section. Fig. 4 is a section through a portion of the housing. Figs. 5, 6 and 7 are details.

In the drawings 2, 3, indicate, respectively, the shaft sections of the driving axle with the outer end of each of which a vehicle driving wheel has driving connection. The hubs of the wheels are indicated by 4 but one of which is shown. The inner contiguous ends of the shaft sections are connected by compensating gearing 5 of any approved construction. That which is illustrated in the drawings comprises the bevel wheels 5', 5', each having a driving connection with the inner end of one of the shaft sections, and bevel pinions 6 between the bevel wheels, each mounted upon a shaft 7 which is supported in the differential housing 8. The latter has connected to it a worm gear 9 with which meshes the worm 10 upon the driving shaft 11. The worm 10 is illustrated as formed integral with the drive shaft 11. The bevel wheels 5' are shown to be connected with their respective shaft sections through the instrumentality of square passage ways through the gears which receive the squared ends of the shaft sections, so as to permit relative longitudinal movement of the parts while insuring that those which are connected together will rotate together.

12 is a housing or casing for the power transmitting mechanism, which may be connected with the frame work of the vehicle in any suitable manner. The worm and worm gear and differential gearing are so supported that they may be easily removed as a unit from the housing 12. To this end the gearing is mounted upon a detachable section or cap piece 13 of the axle casing, so that the gear mount including the support 13 may be separated from the rest of the casing, when the axle sections 2, 3 are withdrawn from the differential gears a sufficient distance. The gear support and bearing piece 13 is preferably an integral casting suitably shaped, and is secured in position by bolts 14. It is formed with pillow blocks or rests 15 in which are mounted the supporting bearings 16 and thrust bearings 17, which directly support the sleeve portions 8' of the differential housing 8, and indirectly the inner ends of the driven shaft sections. The bearings just referred to may be of any suitable type of anti-friction bearing, for illustration ball bearings of well known construction are shown. These ball bearings are held in place by a cap piece or bearing yoke 18 which at its opposite ends is secured to the pillow block portions 15 of the removable portion 13 of the gearing housing or case by means of bolts 18'.

The sleeves 8' of the differential housing are preferably stepped, the load bearings 16 occupying the inner and higher—that is, more remote from the axis of rotation— steps while the thrust bearings 17 occupy the outer and lower steps. An adjusting ring 20 for setting or adjusting each thrust bearing 17, as well as permitting and effecting lateral adjustment of the differential housing 8 and worm gear 9 is employed. Each adjusting ring has a screw threaded engagement with the adjacent pillow block or rest 15 and end of the bearing yoke 18, which together constitute a supporting ring for the bearings and adjusting ring arranged therebetween. A lock of any preferable kind, as indicated at 21 by a bolt extending through the support 18, is employed for holding the adjacent adjusting ring 20 in place.

The parts are so shaped, disposed and correlated that the housing 8 may be adjusted laterally independently of the shaft sections 2, 3 for the purpose of insuring proper mesh relationship between the worm gear 9 and worm 10.

The removable cap piece 13 of the axle housing is provided with a pair of oppositely extending hubs 22, 23 in alinement with each other and disposed to receive the drive shaft 11. The outer end of this shaft is shown to lie within the hub 22 which is closed by a cap 24.

The proper lubrication of worm gearing is an essential factor in economical and efficient operation of the gearing and durability thereof. My idea contemplates a construction which will enable even an unskilled person to easily operate the gearing under the proper conditions of lubrication.

Through the cap 24 extends a duct 24' having a port 24ᵃ disposed at a point above the plane of contact of the worm gear 9 and worm 10, so that a suitable lubricant may be introduced through the port 24ᵃ and the proper lubricant level within the axle housing established. The duct 24' and port 24ᵃ in addition to their function in the establishment and maintenance of the proper lubricant level, facilitate easy inspection of the level of the lubricant within the axle housing.

24ᵇ is a closure or bolt for the upper end of the duct 24'.

25 is an anti-friction bearing disposed within the hub 22 so as to be longitudinally movable to and fro therein and to support the free or outer end of the drive shaft 11, which latter is screw threaded to receive a nut 26.

30 indicates an anti-friction bearing for the drive shaft which is arranged in the hub 23. It, like the bearing 25, is longitudinally adjustable within its support, and may be of any suitable construction of load taking bearing. Washers or sleeves 27, 28 may be interposed between the shoulders of the drive shaft 11 and the adjacent load bearings 25, 30, respectively.

35 indicates as an entirety a thrust bearing. It comprises the cylindrical member 36, spacing ring 37, balls 38 and rings 39, 39. The rings 39, 39 snugly fit the internal spherical surfaces of the cylindrical section 36 so that the parts of the bearings contained within the cylinder 36 may have universal movement relative thereto. 40, 40' are sleeves or collars for locating the position of the center ring 37 of the thrust bearing. The thrust bearing as an entirety is positioned within the hub 23 between the shoulder 23' thereof and a screw threaded ring or adjustment collar 32. 31, 31 are nuts carried by the shaft 11. The ring 32 may be locked in position in any suitable manner. For the purpose I have illustrated a locking ring 33.

It will be noted that the position of the worm 10 relative to the worm gear 9 is determined by the location of the thrust ring 37. The utmost nicety of adjustment between the worm 10 and worm gear 9 may be readily attained by my construction, which lends itself admirably to manufacturing ends and insures that the proper relationship between the worm and the worm gear may be obtained without the necessity of almost prohibitive requirements in precision of manufacture of the correlated parts. The worm, drive shaft, load bearings and thrust bearings are held together as a unit by the nuts 26 and 31 and these parts as a unit may be adjusted to and fro within the worm housing or casing. For convenience sake this unit may be referred to as the drive shaft unit. With this construction a standard distance between the plane of the shoulder 23' and a parallel plane through the axis of the worm gear 9 may be established, and the proper relation of the worm 10 to the worm gear 9 accurately determined by a washer 23ᵃ of the required dimensions interposed between the shoulder 23' and the bearing cylinder 36, to position the thrust ring 37 so as to insure mathematically correct meshing of the gearing. My construction not only lends itself admirably to the assembling of the co-acting parts in the first instance, but in the event that a new worm is to be substituted or a new thrust bearing or any parts carried by the drive shaft, the drive shaft unit may be re-assembled, measured up and a suitable washer 23ᵃ provided to insure the proper meshing relations of the worm with the worm gearing under the new or altered conditions.

To collect any metal particles or chips thrown off by the gearing within the housing 12 in the operation of power transmitting mechanism, I have provided in the worm casing a collecting pocket 41 arranged at one end of the casing beneath the worm 10 and provided with an outlet duct 42 normally closed by a plug screw 43. From time to time in the operation of the mechanism this plug screw may be removed and any foreign particles collected in the pocket 41 withdrawn without disturbing any other part of the assembly.

The drive shaft unit, including shaft 11 thereof may be assembled as a unit and introduced as such into the housing section therefor provided in the removable cap piece 13; in fact all the parts carried by this cap piece may be assembled as a gear mount unit, which unit is then placed in position and secured to the other portion of the housing 12 by nuts 14.

The proper position of the worm 10 is determined by the shoulder 23', and if needs be by a suitable washer 23ª. The correct meshing relation laterally of the worm and worm gear may be obtained by lateral adjustment of the differential housing 8 through the instrumentality of the adjusting collars or rings 20.

The bearing yoke 18 in addition to serving to support between its ends and the adjacent pivot blocks the anti-friction bearings for the differential housing 8, serves to strengthen the bearing supports as an entirety, and to provide an unusually rigid supporting structure for the differential housing. Where a worm gear is used for driving the differential housing considerable end thrust is encountered in operation and my idea of bearing yoke is of peculiar advantage in taking care of such end thrust. While I have disclosed its use in connection with a worm gear, it will be understood that it is equally applicable in connection with bevel gearing or any other well known type of gearing which could be used in like manner.

While the lubricant level may be established by removing the plug 24ᵇ and introducing a suitable lubricant through the port 24ª, until the lubricant overflows at that port, it may also be established by removing the plug 24ᵇ and also the plug 43 which is located in the upper part of the axle housing in which the worm gear 9 is located, and by introducing lubricant through said upper opening until it overflows at the port 24ª.

It will be noted that the mouth of the sediment pocket 41 is relatively narrow owing to a flange 41' extending downwardly from the support for the bearing 25, so that once any sediment or foreign material is collected in this pocket with its narrow mouth, it will remain there, since the agitation of the lubricant by the gearing will tend to preclude such particles from working their way out through the mouth against the action of the lubricant as set up by the operation of the gearing. It will be further noted that the support and mounting for the bearing 25 is such, that this bearing may move to and fro within the housing not only when the parts are being properly assembled, but during the operation of the gearing, should there be any tendency due to expansion of the worm or shaft, such as might be occasioned by the heating thereof, this expansion in the direction of the axis of the worm, and any contraction which would follow, is accommodated by the freedom of the bearing 25 to move to and fro longitudinally with its support.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting. I have elected to claim herein the common patentable subject-matter disclosed in this application and in my original application Serial No. 682,951, filed March 11, 1912.

What I claim is:—

1. In mechanism of the class described, the combination of a housing, a worm gear rotatably mounted in said housing, a driving shaft, a worm on said driving shaft meshing with said worm gear, a load bearing adjacent one end of said driving shaft and longitudinally movable within and supported by said housing, bearings for taking both load and thrust adjacent the other end of said drive shaft and longitudinally movable within and supported by said housing, and means for connecting said drive shaft with worm thereon and all said bearings together as a drive shaft unit, whereby said unit as an entirety is longitudinally adjustable to and fro within said housing.

2. In mechanism of the class described, the combination of a housing, a worm gear rotatably mounted in said housing, a worm for driving said worm gear, a driving shaft which carries said worm, a load bearing adjacent one end of said drive shaft and longitudinally movable with said shaft within and supported by said housing, bearings for taking both load and thrust arranged within said housing adjacent the other end of said drive shaft and longitudinally movable with said shaft within and supported by said housing, means connecting said drive shaft with worm thereon and all of said bearings together as a drive shaft unit, and means removable at will from said housing for determining the position of said drive shaft unit therein.

3. In mechanism of the class described, the combination of a housing, a worm gear rotatably mounted in said housing, a worm for driving said worm gear, a driving shaft which carries said worm, a load bearing adjacent one end of said drive shaft and longitudinally movable with said shaft within and supported by said housing, bearings for taking both load and thrust arranged within said housing adjacent the other end of said drive shaft and longitudinally movable with said shaft within and supported by said housing, means connecting said drive shaft with worm thereon and all of said bearings together as a drive shaft unit, and means removable at will from said housing for determining the position of said drive shaft unit therein, including a washer and an adjustment collar, one arranged at either side of said thrust bearing.

4. In mechanism of the class described, the combination of a housing, a worm gear rotatably mounted in said housing, a driving shaft having a worm formed integrally therewith and meshing with said worm gear, a load bearing adjacent one end of said driving shaft and longitudinally movable within and supported by said housing, bearings for taking both load and thrust adjacent to the other end of said drive shaft and longitudinally movable within and supported by said housing, and means for connecting said drive shaft with worm thereon and all said bearings together as a drive shaft unit, whereby said unit as an entirety is longitudinally adjustable to and fro within said housing.

5. In mechanism of the class described, the combination of a housing, a worm gear rotatably mounted in said housing, a driving shaft having a worm formed integrally therewith and meshing with said worm gear, a load bearing adjacent one end of said driving shaft and longitudinally movable within and supported by said housing, bearings for taking both load and thrust adjacent to the other end of said drive shaft and longitudinally movable within and supported by said housing, said driving shaft being screw threaded adjacent the points at which it is supported near either end by said bearings, and nuts fitting said screw threaded portions of the drive shaft and connecting together said shaft and the bearings thereon as a unit which is longitudinally adjustable to and fro within said housing.

6. A housing for a worm gear driven axle having a section to receive the worm gear and a section arranged therebeneath to receive the worm, said latter section having a duct extending therefrom and terminating externally in a port disposed above the plane of contact for said worm gearing within said housing.

7. A housing for a worm gear driven axle having a section to receive the worm gear, a section arranged therebeneath to receive the worm, and a cap for one end of said last described section having a duct extending therethrough and terminating externally in a port arranged above the plane of contact for the worm gearing within said housing.

8. A housing for a worm gear driven axle having a section to receive the worm gear and a section arranged therebeneath to receive the worm, said latter section formed adjacent one end thereof and at its bottom with a pocket having a relatively narrow mouth in line with the inner wall of the bottom of the housing.

9. A housing for a worm gear driven axle having a section to receive the worm gear and a section arranged therebeneath to receive the worm, said latter section formed adjacent one end thereof with a bearing support and therebeneath a pocket having a relatively narrow mouth in line with the inner wall of the bottom of the housing.

10. In combination with an axle housing, a differential mechanism located therein and including a differential housing, bearing blocks carried by the axle housing and supporting said differential housing, and a bearing yoke connected at either end to the adjacent bearing block.

11. In combination an axle housing, a differential mechanism located therein and having a differential housing, bearing blocks carried by said axle housing and supporting the said differential housing, and a bearing yoke extending across said differential housing and connected at either end to the adjacent bearing block.

12. In combination an axle housing provided with bearing blocks, differential mechanism including a differential housing supported in said bearing blocks, a bearing yoke extending between said bearing blocks and connected at either end to the adjacent bearing block, a driven gear carried by said differential housing, and a driving gear in mesh with said driven gear and mounted in said axle housing.

13. In combination an axle housing having bearing blocks, a bearing yoke extending between said bearing blocks, connected at either end to the adjacent bearing block and forming therewith a cylindrical bearing support, and a differential mechanism mounted at either end in the bearing support formed by said bearing yoke and the adjacent bearing block.

14. In combination an axle housing having bearing blocks, a bearing yoke extending between said bearing blocks, connected at either end to the adjacent bearing block and forming therewith cylindrical passage ways, anti-friction bearings mounted in said cylindrical passage ways, and a differential mechanism including a housing mounted in said anti-friction bearings.

15. In combination an axle housing provided with bearing blocks, differential mechanism including a differential housing supported in said bearing blocks, a bearing yoke extending between said bearing blocks and connected at either end to the adjacent bearing block, a driven gear carried by said differential housing, a driving gear in mesh with said driven gear and mounted in said axle housing, and collars, each adjustably mounted between one of said bearing blocks and the adjacent end of said bearing yoke for laterally adjusting the differential mechanism.

16. In mechanism of the class described, the combination of a housing, a worm gear rotatably mounted in said housing, a driving shaft, a worm on said driving shaft meshing with said worm gear, bearings for taking both load and thrust in both directions adjacent to one end of said driving shaft and positioned within said housing, a bearing for the other end of said driving shaft connected thereto and mounted in said housing to move longitudinally to and fro therein, and means for connecting said driving shaft with worm thereon and all of said bearings together as a drive shaft unit.

17. In mechanism of the class described, the combination of a housing, a worm gear rotatably mounted in said housing, a driving shaft, a worm on said driving shaft meshing with said worm gear, bearings at one end of said driving shaft for taking both load and thrust in both directions, a bearing for the other end of said driving shaft connected thereto and mounted in said housing to move longitudinally to and fro therein, and means for positioning within the housing said bearings which take the thrust and holding them in position, whereby said bearing at the other end of the driving shaft is free to move longitudinally within the housing during the operation of the mechanism.

18. A housing for gear driven axle having a section to receive the driven gear and another to receive the driving gear and formed at its bottom with a sediment pocket having a relatively narrow mouth in line with the inner wall of the bottom of the housing.

19. In mechanism of the class described, the combination of a housing having an enlarged section to receive a worm gear and a tubular section to receive a worm, a worm gear rotatably mounted in said housing, a driving shaft having a driven and a free end, a worm on said driving shaft meshing with said worm gear, and anti-friction bearings for taking both load and thrust in both directions, arranged at one side of said worm on the driven end of said driving shaft and within one end of said tubular section, the other end of said tubular section having a support for rotatably supporting said free end of said driving shaft, shaped to permit the driving shaft to come and go longitudinally within said housing during the assembly, disassembly and operation of said mechanism.

20. In mechanism of the class described, the combination of a housing having an enlarged section to receive a worm gear and a tubular section to receive a worm, a worm gear rotatably mounted in said housing, a driving shaft having a driven and a free end, a worm on said driving shaft meshing with said worm gear, anti-friction bearings for taking both load and thrust in both directions, arranged at one side of said worm on the driven end of said driving shaft and within one end of said tubular section, the other end of said tubular section having a support for rotatably supporting said free end of said driving shaft, shaped to permit said driving shaft to come and go longitudinally within said housing during the assembly, disassembly and operation of said mechanism, means for securing said driving shaft and anti-friction bearings together, and means for securing said anti-friction bearings in position in said tubular section of the housing.

21. In mechanism of the class described, the combination of a housing having an enlarged section to receive a worm gear and a tubular section to receive a worm, a worm gear rotatably mounted in said housing, a driving shaft, a worm on said driving shaft meshing with said worm gear, annular anti-friction bearings for taking load arranged on said driving shaft at opposite sides of said worm thereon and supported in said tubular section so as to be capable of longitudinal movement in either direction therein, an anti-friction bearing for taking thrust in both directions supported in said tubular section and arranged on said driving shaft adjacent one of said annular load bearings, means for securing said thrust bearing in position on said driving shaft, and means for securing said thrust bearing in position in said tubular section of the housing.

In testimony whereof I affix my signature, in presence of two witnesses.

WALTER C. BAKER.

Witnesses:
FRED C. DORN,
F. PHILIP DORN.